US012581371B2

(12) United States Patent
Zhang

(10) Patent No.: US 12,581,371 B2
(45) Date of Patent: Mar. 17, 2026

(54) METHOD AND DEVICE FOR USE IN NON-TERRESTRIAL NETWORK (NTN)

(71) Applicant: APOGEE NETWORKS, LLC, Dallas, TX (US)

(72) Inventor: Xiaobo Zhang, Shanghai (CN)

(73) Assignee: Apogee Networks, LLC, Plano, TX (US)

(*) Notice: Subject to any disclaimer, the term of this patent is extended or adjusted under 35 U.S.C. 154(b) by 538 days.

(21) Appl. No.: 17/748,038

(22) Filed: May 19, 2022

(65) Prior Publication Data

US 2022/0279417 A1     Sep. 1, 2022

Related U.S. Application Data

(63) Continuation of application No. PCT/CN2020/125039, filed on Oct. 30, 2020.

(30) Foreign Application Priority Data

Nov. 22, 2019    (CN) .......................... 201911152654.5

(51) Int. Cl.
*H04W 36/00*          (2009.01)
*G01S 5/00*           (2006.01)
        (Continued)

(52) U.S. Cl.
CPC ....... *H04W 36/0058* (2018.08); *G01S 5/0063* (2013.01); *H04W 4/021* (2013.01);
        (Continued)

(58) Field of Classification Search
CPC ............. H04W 36/0058; H04W 4/021; H04W 36/0011; H04W 36/0083; H04W 36/322;
        (Continued)

(56) References Cited

U.S. PATENT DOCUMENTS

2008/0146231 A1     6/2008   Huang
2012/0329507 A1    12/2012   Watanabe
        (Continued)

FOREIGN PATENT DOCUMENTS

CN         102740385 A    10/2012
CN         104853432 A     8/2015
        (Continued)

OTHER PUBLICATIONS

ISR received in application No. PCT/CN2020/125039 dated Jan. 27, 2021.
        (Continued)

*Primary Examiner* — Ricky Q Ngo
*Assistant Examiner* — Kabir U Jahangir
(74) *Attorney, Agent, or Firm* — VOLPE KOENIG

(57)        ABSTRACT

A method and a device in a communication node used for wireless communications. A first node performs measurement on a first radio signal, and receives a first signaling; transmits a second radio signal when a first condition is fulfilled; otherwise, transmits transmission of the second radio signal; herein, the measurement performed on the first radio signal is used to determine a first measurement value; the first condition comprises a relative magnitude between the first measurement value and a first reference value, the first condition comprising a first geographical location of the first node and a relative positional relation between the first node and a reference geographical zone; the first signaling is used to determine the first reference value. The present disclosure can reduce the signaling overhead related to the measurement and measurement report during the procedure of UE handover between base stations, thus achieving synchronous handover of multiple users.

15 Claims, 6 Drawing Sheets

(51) Int. Cl.

| | | |
|---|---|---|
| *H04W 4/021* | (2018.01) | |
| *H04W 36/32* | (2009.01) | |
| *H04W 84/06* | (2009.01) | |

(52) U.S. Cl.
CPC .... *H04W 36/0011* (2013.01); *H04W 36/0083* (2013.01); *H04W 36/322* (2023.05); *H04W 84/06* (2013.01)

(58) Field of Classification Search
CPC . H04W 84/06; H04W 24/10; H04W 36/0009; H04W 36/0088; G01S 5/0063
See application file for complete search history.

(56) References Cited

U.S. PATENT DOCUMENTS

| | | | |
|---|---|---|---|
| 2015/0181481 A1* | 6/2015 | Masini ............... | H04W 36/322 |
| | | | 455/436 |
| 2019/0357065 A1* | 11/2019 | Cho ............... | H04W 36/00692 |
| 2020/0178130 A1* | 6/2020 | Pakniat ............ | H04W 36/0094 |
| 2021/0367876 A1* | 11/2021 | Ramachandra ....... | H04W 24/10 |
| 2021/0377828 A1* | 12/2021 | Tao ................... | H04W 74/0833 |
| 2022/0086721 A1* | 3/2022 | Wu ................ | H04W 36/00698 |
| 2022/0124590 A1* | 4/2022 | Da Silva ............ | H04W 36/302 |

FOREIGN PATENT DOCUMENTS

| | | |
|---|---|---|
| CN | 106604328 A | 4/2017 |
| CN | 106817676 A | 6/2017 |
| CN | 107124743 A | 9/2017 |
| CN | 107295468 A | 10/2017 |
| IN | 103167423 A | 6/2013 |
| WO | 2014019740 A1 | 2/2014 |

OTHER PUBLICATIONS

CN201911152654.5 First Office Action dated Sep. 7, 2021.
CN201911152654.5 Second Office Action dated Feb. 16, 2022.
CN201911152654.5 Third Office Action dated Apr. 26, 2022.
CN201911152654.5 First Search Report dated Sep. 1, 2021.
CN201911152654.5 Second Search Report dated Feb. 10, 2022.
CN201911152654.5 Notification to Grant Patent Right for Invention dated Jul. 8, 2022.
NEC "location based mobility enhancement " 3GPP TSG RAN WG2_R2 R2-1914973,Nov. 8, 2019.
Spreadtrum communications "Impacts caused by measurement variations in NTN" 3GPP TSG RAN WG2 R2 Apr. 30, 2019.
Hua Wei et al. NR Uu and LTE Uu support and enhancement for advanced V2X use cases 3GPP TSG RAN WGI Meeting #95 RI-1812212, Nov. 16, 2018.
A New Method To Distinguish Interior/Exterior Users in LTE Jiangang QI, Apr. 15, 2009.
Thales et al., "Study on NR to support Non-Terrestrial Networks," 3GPP TSG RAN WG1 Meeting 88bis, RP-171450, West Palm Beach, USA (Jun. 5-9, 2017).
Third Generation Partnership Project, "Technical Specification Group Radio Access Network; NR; NR and NG-RAN Overall Description; Stage 2 (Release 15)," 3GPP TS 38.300 V15.7.0 (Sep. 2019).
Third Generation Partnership Project, "Technical Specification Group Radio Access Network; NR; Radio Resource Control (RRC) protocol specification (Release 15)," 3GPP TS 38.331 V15.7.0 (Sep. 2019).

* cited by examiner

100

First Node performing measurement on first radio signal, and receiving first signaling — 101 transmitting second radio signal when first condition is fulfilled; otherwise, dropping transmission of the second radio signal — 102

5GS/EPS 200

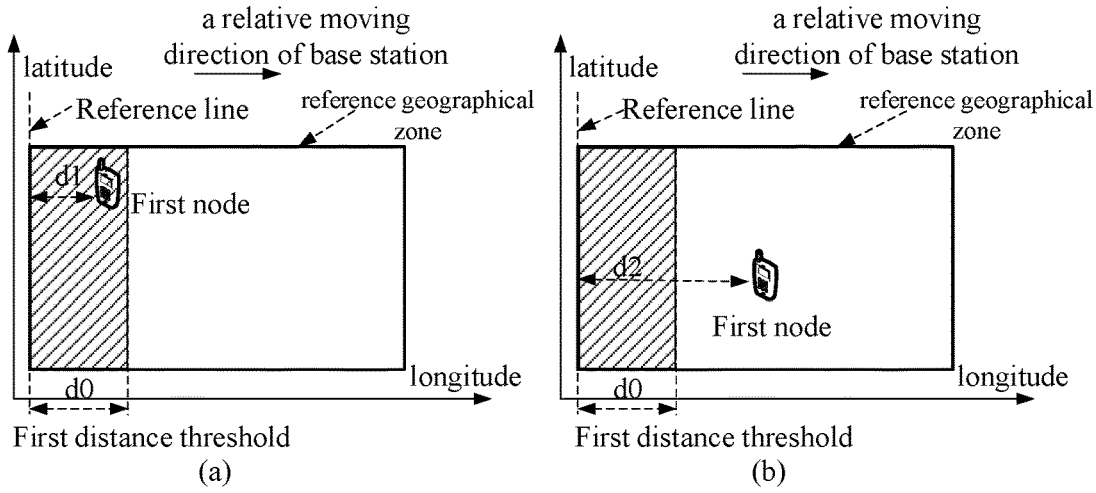
FIG. 8
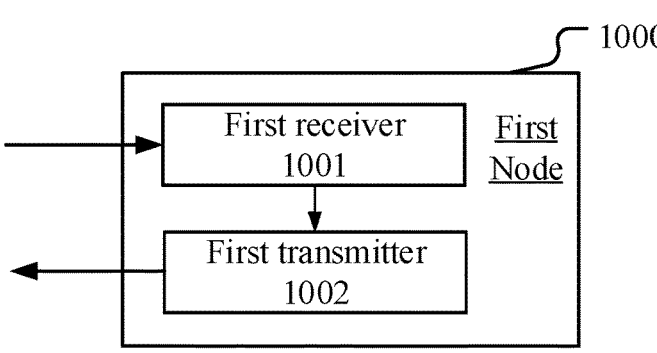
FIG. 9
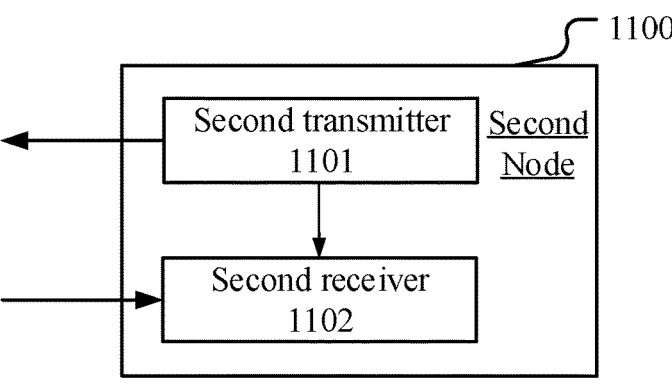
FIG. 10
FIG. 11

1200

METHOD AND DEVICE FOR USE IN NON-TERRESTRIAL NETWORK (NTN)

CROSS REFERENCE TO RELATED APPLICATIONS

This application is the continuation of International Patent Application No. PCT/CN2020/125039, filed on Oct. 30, 2020, which claims the priority benefit of Chinese Patent Application No. 201911152654.5, filed on Nov. 22, 2019, the full disclosure of which is incorporated herein by reference.

BACKGROUND

Technical Field

The present disclosure relates to transmission methods and devices in wireless communication systems, and in particular to a method and a device for large-delay transmission.

Related Art

With the communications requests becoming more extensive and demanding, the 3rd Generation Partner Project (3GPP) kicks off studies on Non-Terrestrial Network (NTN), and at the 3GPP RAN #80 conference it was decided that a study item (SI) of solutions to New Radio (NR)-supported NTN shall be conducted, as a continuity of the previously proposed NR-supported NTN SI (RP-171450). One important aspect of the study item is Mobility.

SUMMARY

In the NTN environment, the NTN Basestation (BS) has a larger coverage, so when multiple User Equipments (UEs) are concentrated in a same zone, as the NTN BS moves, the gathering UEs will move to the edge of coverage of a serving cell for the NTN BS, which will trigger a Cell Handover procedure. During the conventional handover procedure, a UE measures a Neighboring Cell according to a Measurement Configuration delivered by a Source BS to the UE, when a Triggering Event is fulfilled, the UE sends a Measurement Report to the BS, upon the report of measurement result to the BS, the BS will determine according to the result whether to switch the UE to a Target BS. As the traditional handover procedure goes, the simultaneous handover of the multiple UEs that get together will result in a great amount of signaling overhead.

To address the above problem, the present disclosure provides a solution. Although the description above only takes NTN scenarios as an example; the present disclosure is also applicable to scenarios of terrestrial transmissions, where similar technical effects can be achieved. Additionally, the adoption of a unified solution for various scenarios contributes to the reduction of hardcore complexity and costs.

It should be noted that if no conflict is incurred, embodiments in any node in the present disclosure and the characteristics of the embodiments are also applicable to any other node, and vice versa. Furthermore, the embodiments in the present disclosure and the characteristics in the embodiments can be arbitrarily combined if there is no conflict.

The present disclosure provides a method in a first node for wireless communications, comprising:

performing a measurement on a first radio signal, and receiving a first signaling;

transmitting a second radio signal when a first condition is fulfilled; otherwise, dropping transmission of the second radio signal;

wherein, a measurement performed on the first radio signal is used to determine a first measurement value; the first condition comprises a relative magnitude of the first measurement value and a first reference value, and the first condition comprises a relative positional relation between a first geographical location of the first node and a reference geographical zone; the first signaling is used to determine the first reference value; the second radio signal is used to determine whether a connection is established with a neighbor node of a transmitter for the first signaling.

In one embodiment, a problem to be solved in the present disclosure is how to prevent a large amount of signaling overhead during simultaneous handover of multiple UEs from a same source base station to a same target base station.

In one embodiment, characteristics of the above method include: the UE that fulfills the first condition transmits positional information for the UE in its measurement report, and the base station performs handover of the multiple UEs within a same zone according to the UE's positional information, where the UE is among the multiple UEs.

In one embodiment, characteristics of the above method include that the condition for handover of measurement report in the present disclosure is higher than a threshold traditionally set for a handover-triggering event, the handover of the UE is not totally dependent on its own measurement or measurement reporting.

In one embodiment, advantages of the above method include that for multiple UEs located in a same said reference geographical zone, only a few will trigger a measurement and measure reporting procedure, so the eNB will perform handover procedures for the multiple UEs in the same zone according to measurement reports by the few UEs, hence a reduction in the network measurement and the measurement report overhead.

According to one aspect of the present disclosure, characterized in performing a measurement on a third radio signal; wherein, the measurement performed on the third radio signal is used to determine a second measurement value; the first condition comprises a relative magnitude of the second measurement value and a second reference value, or the second measurement value is used to determine the first reference value; when the first condition comprises a relative magnitude of the second measurement value and the second reference value, the first signaling is used to determine the second reference value.

In one embodiment, characteristics of the above method include: the first measurement value and the second measurement value obtained by respectively performing measurements on the first radio signal and the third radio signal can determine two different thresholds.

In one embodiment, advantages of the above method include that adopting double thresholds for a triggering event for the measurement report can further reduce unnecessary measurements or measurement reports by the UE.

According to one aspect of the present disclosure, characterized in receiving first information; herein, the first condition is one of K candidate conditions, the first information is used to determine the first condition out of the K candidate conditions; the K candidate conditions are predefined, or the K candidate conditions are configurable; where K is a positive integer.

According to one aspect of the present disclosure, characterized in receiving second information; wherein, the second information is used to determine the reference geographical zone.

According to one aspect of the present disclosure, characterized in that when the first condition is fulfilled, the first geographical location of the first node is at an edge/peripheral position of the reference geographical zone.

According to one aspect of the present disclosure, characterized in receiving third information; wherein, the third information is used for indicating whether a measurement is performed on the first radio signal; when the first geographical location of the first node is in an inner part of the reference geographical zone, the third information is used for indicating that no measurement is performed on the first radio signal; when the first geographical location of the first node is at an edge/peripheral position of the reference geographical zone, the third information is used for indicating that a measurement is performed on the first radio signal; the third information occupies 1 information bit.

The present disclosure provides a method in a second node for wireless communications, comprising:

transmitting a first signaling, and transmitting a fourth signal;

receiving a second radio signal when a first condition is fulfilled; otherwise, dropping reception of the second radio signal; and receiving a fifth signal;

wherein, a measurement performed by a receiver for the first signaling on the first radio signal is used to determine a first measurement value; the first condition comprises a relative magnitude of the first measurement value and a first reference value, and the first condition comprises a relative positional relation between a first geographical location of the receiver for the first signaling and a reference geographical zone; the first signaling is used to determine the first reference value; the second radio signal is used to determine whether a connection is established with a neighbor node of the second node; the fourth signal is used to make a request for establishing a connection between first-type nodes and the said neighbor node of the second node, the first-type nodes include multiple nodes; a measurer for the first radio signal is one of the first-type nodes; the fifth signal is used to acknowledge a connection established between the first-type nodes and the said neighbor node of the second node.

In one embodiment, characteristics of the above method include that the fourth signal is used for a transmission of a handover request message by a source base station to a target base station, where the fourth signal comprises identifiers for multiple UEs.

In one embodiment, characteristics of the above method include that the fifth signal is used for a transmission of a handover request response message by a target base station to a source base station, where the fifth signal comprises identifiers for UEs acceptable to the target base station.

In one embodiment, advantages of the above method include that cell handover can be performed for multiple UEs simultaneously with the method proposed in the present disclosure.

According to one aspect of the present disclosure, characterized in performing a measurement on a third radio signal; wherein, the measurement performed on the third radio signal is used to determine a second measurement value; the first condition comprises a relative magnitude of the second measurement value and a second reference value, or the second measurement value is used to determine the first reference value; when the first condition comprises a relative magnitude of the second measurement value and the second reference value, the first signaling is used to determine the second reference value.

According to one aspect of the present disclosure, characterized in transmitting first information; wherein, the first condition is one of K candidate conditions, the first information is used to determine the first condition out of the K candidate conditions; the K candidate conditions are predefined, or the K candidate conditions are configurable; where K is a positive integer.

According to one aspect of the present disclosure, characterized in transmitting second information; wherein, the second information is used to determine the reference geographical zone.

According to one aspect of the present disclosure, characterized in that when the first condition is fulfilled, the first geographical location of a receiver for the first signaling is at an edge/peripheral position of the reference geographical zone.

According to one aspect of the present disclosure, characterized in transmitting third information; wherein, the third information is used for indicating whether a measurement is performed on the first radio signal; when the first geographical location of a receiver for the first signaling is in an inner part of the reference geographical zone, the third information is used for indicating that no measurement is performed on the first radio signal; when the first geographical location of a receiver for the first signaling is at an edge/peripheral position of the reference geographical zone, the third information is used for indicating that a measurement is performed on the first radio signal; the third information occupies 1 information bit.

According to one aspect of the present disclosure, the fourth signal comprises identifiers for multiple nodes among the first-type nodes.

The present disclosure provides a method in a third node for wireless communications, comprising:

transmitting a first radio signal, and transmitting a fifth signal;

receiving a fourth signal;

wherein, a measurement performed on the first radio signal is used to determine a first measurement value; the first condition comprises a relative magnitude of the first measurement value and a first reference value, and the first condition comprises a relative positional relation between a first geographical location of the first node and a reference geographical zone; the first signaling is used to determine the first reference value; when a first condition is fulfilled, transmit a second radio signal; otherwise, drop transmitting the second radio signal; the second radio signal is used to determine whether a connection is established between a measurer for the first radio signal and the third node; the fourth signal is used to make a request for establishing a connection between first-type nodes and the third node; the first-type nodes include multiple nodes; a measurer for the first radio signal is one of the first-type nodes; the fifth signal is used to acknowledge a connection established between the first-type nodes and the third node.

According to one aspect of the present disclosure, characterized in transmitting a third radio signal; wherein, the measurement performed on the third radio signal is used to determine a second measurement value; the first condition comprises a relative magnitude of the second measurement value and a second reference value, or the second measurement value is used to determine the first reference value; when the first condition comprises a relative magnitude of the second measurement value and the second reference value, the first signaling is used to determine the second reference value.

According to one aspect of the present disclosure, characterized in that a measurer for the first radio signal receives first information; wherein, the first condition is one of K candidate conditions, the first information is used to determine the first condition out of the K candidate conditions; the K candidate conditions are pre-defined, or the K candidate conditions are configurable; where K is a positive integer.

According to one aspect of the present disclosure, characterized in receiving second information; wherein, the second information is used to determine the reference geographical zone.

According to one aspect of the present disclosure, characterized in that when the first condition is fulfilled, the first geographical location of a measurer for the first radio signal is at an edge/peripheral position of the reference geographical zone.

According to one aspect of the present disclosure, characterized in receiving third information; wherein, the third information is used for indicating whether a measurement is performed on the first radio signal; when the first geographical location of a measurer for the first radio signal is in an inner part of the reference geographical zone, the third information is used for indicating that no measurement is performed on the first radio signal; when the first geographical location of a measurer for the first radio signal is at an edge/peripheral position of the reference geographical zone, the third information is used for indicating that a measurement is performed on the first radio signal; the third information occupies 1 information bit.

According to one aspect of the present disclosure, the fourth signal comprises identifiers for multiple nodes among the first-type nodes.

The present disclosure provides a first node for wireless communications, comprising:

a first receiver, performing a measurement on a first radio signal, and receiving a first signaling;

a first transmitter, transmitting a second radio signal when a first condition is fulfilled; otherwise, dropping transmission of the second radio signal;

wherein, a measurement performed on the first radio signal is used to determine a first measurement value; the first condition comprises a relative magnitude of the first measurement value and a first reference value, and the first condition comprises a relative positional relation between a first geographical location of the first node and a reference geographical zone; the first signaling is used to determine the first reference value; the second radio signal is used to determine whether a connection is established with a neighbor cell of a serving cell for the first node.

The present disclosure provides a second node for wireless communications, comprising:

a second transmitter, transmitting a first signaling, and transmitting a fourth signal;

a second receiver, receiving a second radio signal when a first condition is fulfilled; otherwise, dropping reception of the second radio signal; and receiving a fifth signal;

wherein, a measurement performed by a receiver for the first signaling on the first radio signal is used to determine a first measurement value; the first condition comprises a relative magnitude of the first measurement value and a first reference value, and the first condition comprises a relative positional relation between a first geographical location of the receiver for the first signaling and a reference geographical zone; the first signaling is used to determine the first reference value; the second radio signal is used to determine whether a connection is established with a neighbor node of the second node; the fourth signal is used to make a request for establishing a connection between first-type nodes and the said neighbor node of the second node, the first-type nodes include multiple nodes; a measurer for the first radio signal is one of the first-type nodes; the fifth signal is used to acknowledge a connection established between the first-type nodes and the said neighbor node of the second node.

The present disclosure provides a third node for wireless communications, comprising:

a third transmitter, transmitting a first radio signal, and transmitting a fifth signal;

a third receiver, receiving a fourth signal;

wherein, a measurement performed on the first radio signal is used to determine a first measurement value; the first condition comprises a relative magnitude of the first measurement value and a first reference value, and the first condition comprises a relative positional relation between a first geographical location of the first node and a reference geographical zone; the first signaling is used to determine the first reference value; when a first condition is fulfilled, transmit a second radio signal; otherwise, drop transmitting the second radio signal; the second radio signal is used to determine whether a connection is established between a measurer for the first radio signal and the third node; the fourth signal is used to make a request for establishing a connection between first-type nodes and the third node; the first-type nodes include multiple nodes; a measurer for the first radio signal is one of the first-type nodes; the fifth signal is used to acknowledge a connection established between the first-type nodes and the third node.

In one embodiment, compared with the prior art, the present disclosure is advantageous in the following aspects:

Since the channel fluctuations of multiple UEs in the vicinity of a geographical zone are highly similar, according to the scheme provided herein, when the multiple UEs gathering in the same geographical zone are required to make handovers simultaneously, only a UE fulfilling the first condition can perform measurement on the first radio signal and send a measurement report to an NTN base station. The NTN base station then performs simultaneous handover among these UEs based on the measurement report, without needing to ask all UEs to send measurement reports, thus reducing signaling overheads.

BRIEF DESCRIPTION OF THE DRAWINGS

Other features, objects and advantages of the present disclosure will become more apparent from the detailed description of non-restrictive embodiments taken in conjunction with the following drawings:

FIG. 8 illustrates a schematic diagram of a relative positional relation between a first geographical location and a reference geographical zone according to one embodiment of the present disclosure.

FIG. 9 illustrates a schematic diagram of first information used to determine a first condition from K candidate conditions according to one embodiment of the present disclosure.

FIG. 10 illustrates a structure block diagram of a processing device used in a first node according to one embodiment of the present disclosure.

FIG. 11 illustrates a structure block diagram of a processing device used in a second node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
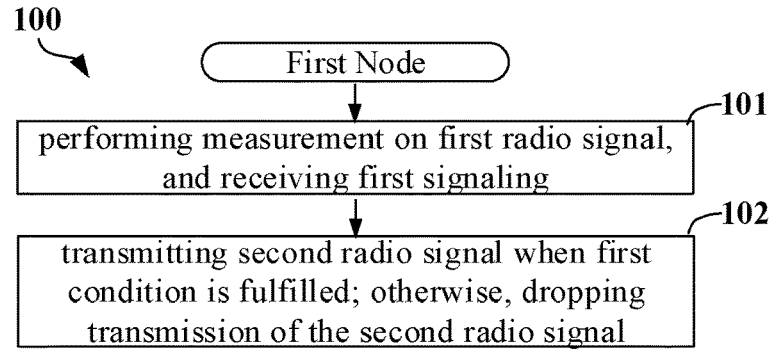
FIG. 1 illustrates a flowchart of transmissions of a first radio signal, a first signaling and a second radio signal according to one embodiment of the present disclosure.

Embodiment 1 illustrates a flowchart of transmissions of a first radio signal, a first signaling and a second radio signal according to one embodiment of the present disclosure, as shown in FIG. 1. In FIG. 1, each step represents a step, it should be particularly noted that the sequence order of each box herein does not imply a chronological order of steps marked respectively by these boxes.

In Embodiment 1, the first node in the present disclosure performs a measurement on a first radio signal, and receives a first signaling in step 101; transmits a second radio signal when a first condition is fulfilled in step 102; otherwise drops transmission of the second radio signal in step 102; wherein, a measurement performed on the first radio signal is used to determine a first measurement value; the first condition comprises a relative magnitude of the first measurement value and a first reference value, and the first condition comprises a relative positional relation between a first geographical location of the first node and a reference geographical zone; the first signaling is used to determine the first reference value; the second radio signal is used to determine whether a connection is established with a neighbor node of a transmitter for the first signaling.

In one embodiment, the first radio signal is transmitted by an air interface.

In one embodiment, the first radio signal is transmitted by a radio interface.

In one embodiment, the first radio signal is a physical layer signal.

In one embodiment, the first radio signal is a baseband signal.

In one embodiment, the first radio signal is a radio frequency signal.

In one embodiment, the first radio signal is a Reference Signal (RS).

In one embodiment, the first radio signal is a Synchronizing Signal (SS).

In one embodiment, the first radio signal is one of Cell-specific reference signals (CSRS), Channel Status Information (CSI), reference signals (RS), a Synchronizing Signal (SS)/Broadcast Channel (PBCH).

In one embodiment, the first radio signal is a Global Navigation Satellite System (GNSS) signal.

In one embodiment, the first radio signal is a Global Positioning System (GPS) signal.

In one embodiment, a cell covered by the neighbor node and a serving cell of the first node adopt a same Radio Access Technology (RAT).

In one embodiment, a cell covered by the neighbor node and a serving cell of the first node adopt different Radio Access Technologies (RATs).

In one embodiment, a cell covered by the neighbor node and a serving cell of the first node are Intra-frequency.

In one embodiment, a cell covered by the neighbor node and a serving cell of the first node are Inter-frequency.

In one embodiment, the second radio signal comprises all or part of a Radio Resource Control (RRC) message.

In one embodiment, the second radio signal is a MeasurementReport Message, the MeasurementReport Message being used to indicate a Measurement Result of the first node.

In one subembodiment, the MeasurementReport Message comprises all or part of a MeasResults IE (i.e., Information Element).

In one embodiment, the MeasResults IE comprises the first measurement value.

In one embodiment, the MeasResults IE comprises the first geographical location of the first node.

In one embodiment, the MeasResults IE comprises the first measurement value and the first geographical location of the first node.

In one embodiment, the first measurement value comprises one of RSRQs obtained by measurements performed on the first radio signal.

In one embodiment, the first measurement value comprises an RSRP obtained by measurements performed on the first radio signal.

In one embodiment, the first measurement value comprises an SINR obtained by measurements performed on the first radio signal.

In one embodiment, the first signaling is an RRC signaling.

In one embodiment, the first signaling comprises all or part of an RRC message.

In one embodiment, the first signaling comprises all or part of an RRCConnectionReconfiguration message.

In one embodiment, the first signaling comprises all or part of an RRCConnectionResume message.

In one embodiment, the first signaling comprises a Measurement Configuration message.

In one embodiment, the first signaling comprises all or part of a MeasConfig IE.

In one embodiment, the MeasConfig IE comprises s-Measure; wherein, the s-Measure is used to determine whether a measurement is performed on the first radio signal; the s-Measure being equal to 0 is used to determine canceling the use of s-Measure.

In one embodiment, the first signaling comprises a triggerQuantity IE.

In one embodiment, the triggerQuantity comprises one of a Reference Signal Received Power (RSRP), a Reference Signal Received Quality (RSRQ), a Signal to Interference plus Noise Ratio (SINR) or a UE Location.

In one embodiment, the triggerQuantity comprises any two of an RSRP, an RSRQ, a SINR or a UE Location.

In one embodiment, the triggerQuantity comprises any three of an RSRP, an RSRQ, a SINR or a UE Location.

In one embodiment, the triggerQuantity comprises an RSRP, an RSRQ, a SINR and a UE Location.

In one embodiment, the first signaling comprises measurement report configuration information, the measurement report configuration information is used to determine principles for triggering a measurement report event.

In one embodiment, the first signaling comprises one of a ReportConfigEUTRA IE, a ReportConfig IE, a ReportConfigNR IE, a ReportConfigInterRAT IE or a ReportConfigToAddModList IE.

In one embodiment, the first signaling comprises the first condition.

In one embodiment, the first signaling comprises the first reference value.

In one embodiment, the first reference value is a threshold.

In one embodiment, the first reference value is configurable.

In one embodiment, the first reference value is UE-specific.

In one embodiment, the first reference value is Cell-specific.

In one embodiment, the first condition comprises a relative magnitude of the first measurement value and the first reference value.

In one embodiment, the first condition comprises that the first measurement value is no less than the first reference value.

In one embodiment, the first condition comprises that the first measurement value is greater than the first reference value.

In one embodiment, the first reference value comprises multiple reference values, the first measurement value comprises multiple measurement values, where the first condition comprises relative magnitudes respectively of the multiple measurement values in the first measurement value and the multiple reference values in the first reference value.

In one embodiment, the first condition comprises a relative positional relation between the first geographical location and the reference geographical zone.

In one embodiment, the relative positional relation comprises that the first geographical location is within the reference geographical zone.

In one embodiment, the relative positional relation comprises that the first geographical location is outside the reference geographical zone.

In one embodiment, the relative positional relation comprises that the first geographical location is in an inner position of the reference geographical zone.

In one embodiment, the relative positional relation comprises that the first geographical location is at an edge/peripheral position of the reference geographical zone.

In one embodiment, both the inner position and the peripheral position are within the reference geographical zone.

In one embodiment, the first condition comprises that the first geographical location is at an edge/peripheral position of the reference geographical zone.

In one embodiment, the first condition simultaneously comprises a relative magnitude of the first measurement value and the first reference value and a relative positional relation between the first geographical location and the reference geographical zone.

In one embodiment, the first condition comprises that the first measurement value is greater than the first reference value and that the first geographical location is at an edge of the reference geographical zone.

In one embodiment, the first condition comprises that the first measurement value is no less than the first reference value and that the first geographical location is at an edge of the reference geographical zone.

In one embodiment, the first geographical location is related to the longitude, the latitude and the altitude.

In one embodiment, the first geographical location is related to the longitude and the latitude.

In one embodiment, the first geographical location is a current geographical location of the first node.

In one embodiment, the first geographical location is a current first geographical location of the first node assumed by the first node.

In one embodiment, the first geographical location is a current geographical location obtained by the first node through measurement.

In one embodiment, the first geographical location is a current actual geographical location of the first node.

In one embodiment, the first geographical location is a geographical location other than a current actual geographical location of the first node.

In one embodiment, the first geographical location is a current geographical location obtained by the first node through positioning.

In one embodiment, the first geographical location is a current geographical location obtained by the first node through satellite positioning.

In one embodiment, the first geographical location is a current geographical location obtained by the first node through satellite positioning and measurement.

In one embodiment, the positioning includes GNSS positioning and GPS positioning.

In one embodiment, the first geographical location is a latitudinal distance and a longitudinal distance from the first node to a point (0, 0) of coordinates in WGS84 model (Military Standard WGS84 Metric MIL-STD-2401 (11 Jan. 1994): "Military Standard Department of Defence World Geodetic System (WGS)") as assumed by the first node.

In one embodiment, the first geographical location of the first node is a geographical position in the reference geographical zone.

In one embodiment, the reference geographical zone is a geographically contiguous zone on occupying a contiguous range of latitude and longitude.

In one embodiment, the reference geographical zone occupies contiguous latitudinal intervals and contiguous longitudinal intervals.

In one embodiment, the reference geographical zone is a geographical zone encircled by a rectangle, as shown by WGS84 model.

In one embodiment, the reference geographical zone is a geographical zone on the earth's surface.

In one embodiment, when the contiguous range of latitude and longitude occupied by the reference geographical zone is much smaller than the earth radius, the reference geographical zone can be seen as a geographical zone encircled by a rectangle.

In one embodiment, the reference geographical zone is a circular geographical zone.

In one embodiment, the reference geographical zone is a geographical zone formed by spots on the earth's surface with equal distances to a central geographical location.

In one embodiment, the reference geographical zone is a contiguous geographical zone on the earth's surface.

In one embodiment, the reference geographical zone is a geographical zone among geographical zones divided across the earth's surface at equal latitudinal intervals and longitudinal intervals from a point (0, 0) of coordinates in WGS84 model (Military Standard WGS84 Metric MIL-STD-2401 (11 Jan. 1994): "Military Standard Department of Defence World Geodetic System (WGS)").

In one embodiment, each said reference geographical zone has an identifier.

In one embodiment, the identifier for the reference geographical zone is globally unique.

In one embodiment, the identifier for the reference geographical zone denotes a unique geographical zone.

In one embodiment, the identifier for the reference geographical zone is pre-configured.

In one embodiment, the identifier for the reference geographical zone is used to determine the reference geographical zone that is unique.

In one embodiment, the identifier for the reference geographical zone is a Zone ID for the reference geographical zone.

In one embodiment, the identifier for the reference geographical zone is an index for the reference geographical zone.

In one embodiment, the identifier for the reference geographical zone is a sequence number for the reference geographical zone.

In one embodiment, the identifier for the reference geographical zone is used to determine the first geographical location.

In one embodiment, different said reference geographical zones are overlapping.

In one embodiment, different said reference geographical zones are non-overlapping.

In one embodiment, the reference geographical zone is pre-configured.

In one embodiment, the reference geographical zone is dynamically configured.

In one embodiment, the phrase of the relative positional relation between the first geographical location of the first node and the reference geographical zone comprises a meaning that the first geographical location of the first node is in an inner position of the reference geographical zone.

In one embodiment, the phrase of the relative positional relation between the first geographical location of the first node and the reference geographical zone comprises a meaning that the first geographical location of the first node is at an edge/peripheral position of the reference geographical zone.

In one embodiment, the first distance threshold is used to determine the first condition.

In one embodiment, when a shortest distance between the first geographical location of the first node and the reference line is no larger than the first distance threshold, the first condition is fulfilled.

In one embodiment, when a shortest distance between the first geographical location of the first node and the reference line is larger than the first distance threshold, the first condition is not fulfilled.

In one embodiment, the reference line is perpendicular to a moving direction of the transmitter for the first signaling relative to the first node.

In one embodiment, the reference line refers to an earliest position of the transmitter for the first signaling as it leaves its coverage zone to move toward the first node.

In one embodiment, the reference line is a straight line.

In one embodiment, the reference line is a curved line.

In one embodiment, the reference line is overlapping with partial boundaries of the reference geographical zone.

In one embodiment, the first distance threshold is configurable.

In one embodiment, the first distance threshold is related to a type of a transmitter for the first signaling.

In one embodiment, the first distance threshold is related to a height of a transmitter for the first signaling.

In one embodiment, the larger zone a transmitter for the first signaling covers, the greater the first distance threshold.

In one embodiment, the phrase that the second radio signal is used to determine whether a connection is established with a neighbor node of a transmitter for the first signaling includes the following meaning:

a transmitter for the first signaling determines according to the second radio signal whether a Handover Request Message is to be sent to the neighbor node.

In one embodiment, the Handover Request Message contains identifiers for other UEs served by a transmitter for the first signaling within the reference geographical zone.

Embodiment 2

Figure 2:
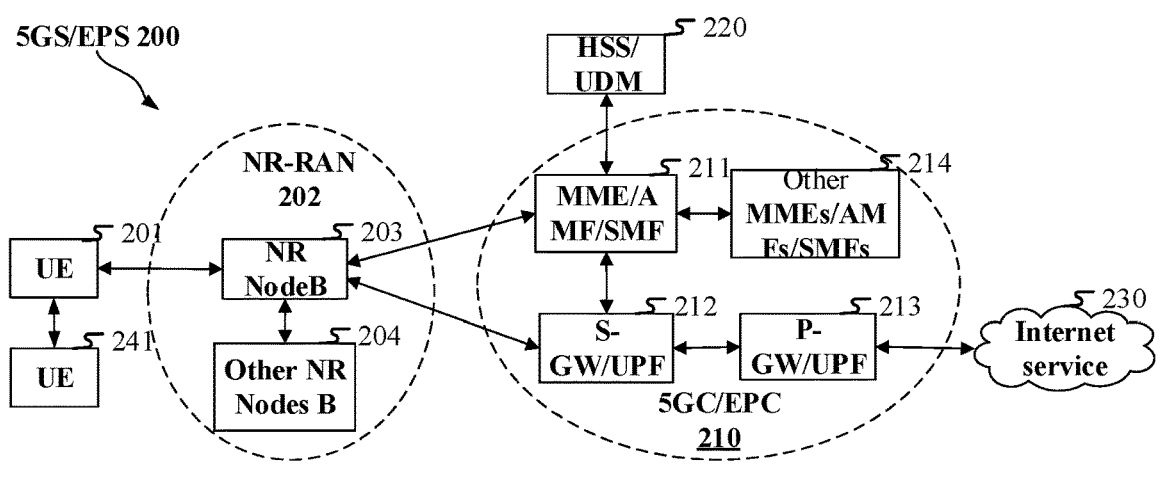
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System/Evolved Packet System (5GS/EPS) 200 or other suitable terminology. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 supports transmissions in NTN.

In one embodiment, the UE 201 supports transmissions in large-delay-difference networks.

In one embodiment, the UE 201 supports transmissions in TN.

In one embodiment, the gNB 203 corresponds to the second node in the present disclosure.

In one embodiment, the gNB 203 corresponds to the third node in the present disclosure.

In one embodiment, the gNB 203 supports transmissions in NTN.

In one embodiment, the gNB 203 supports transmissions in large-delay-difference networks.

In one embodiment, the gNB 203 supports transmissions in TN.

In one embodiment, the gNB 203 is a MacroCellular base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station supporting large time-delay difference.

In one embodiment, the gNB 203 is a flight platform.

In one embodiment, the gNB 203 is satellite equipment.

Embodiment 3

Figure 3:
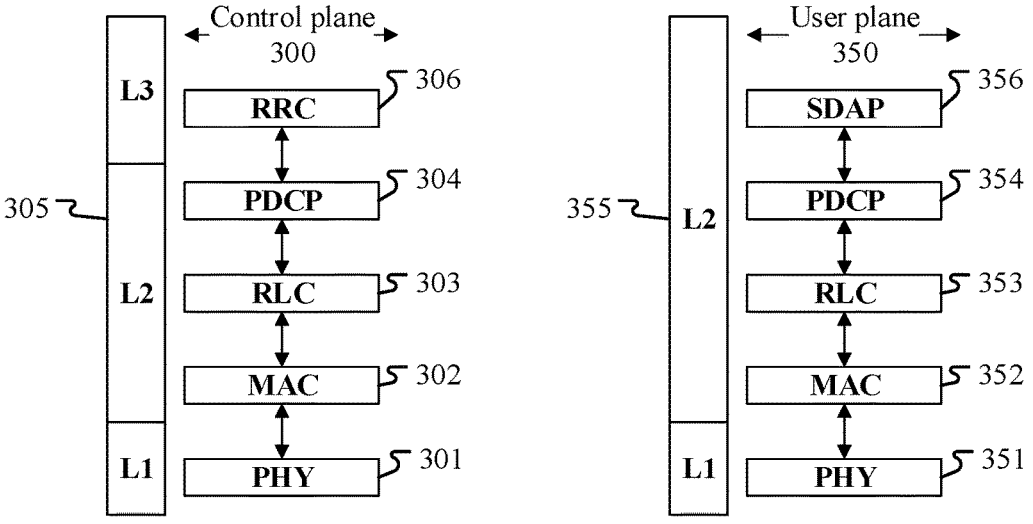
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 is represented by three layers, namely, layer 1, layer 2 and layer 3. The layer 1 (L1) is the lowest layer which performs signal processing functions of various PHY layers. The L1 is called PHY 301 in the present disclosure. The layer 2 (L2) 305 is above the PHY 301, and is in charge of the link between the UE and the gNB via the PHY 301. The L2 305 comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a packet and provides support for inter-cell handover. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling. The radio protocol architecture in the user plane 350 comprises the L1 layer and the L2 layer. In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the first radio signal in the present disclosure is generated by the PHY301 or the PHY351.

In one embodiment, the second radio signal in the present disclosure is generated by the RRC306.

In one embodiment, the second radio signal in the present disclosure is generate by the MAC302 or the MAC352.

In one embodiment, the second radio signal in the present disclosure is generated by the PHY301 or the PHY351.

In one embodiment, the third radio signal in the present disclosure is generated by the PHY301 or the PHY351.

In one embodiment, the first signaling in the present disclosure is generated by the RRC306.

In one embodiment, the first signaling in the present disclosure is generate by the MAC302 or the MAC352.

In one embodiment, the first signaling in the present disclosure is generated by the PHY301 or the PHY351.

In one embodiment, the first information in the present disclosure is generated by the RRC306.

In one embodiment, the first information in the present disclosure is generate by the MAC302 or the MAC352.

In one embodiment, the first information in the present disclosure is generated by the PHY301 or the PHY351.

In one embodiment, the second information in the present disclosure is generated by the RRC306.

In one embodiment, the second information in the present disclosure is generate by the MAC302 or the MAC352.

In one embodiment, the second information in the present disclosure is generated by the PHY301 or the PHY351.

In one embodiment, the third information in the present disclosure is generated by the RRC306.

In one embodiment, the third information in the present disclosure is generate by the MAC302 or the MAC352.

In one embodiment, the third information in the present disclosure is generated by the PHY301 or the PHY351.

Embodiment 4

Figure 4:
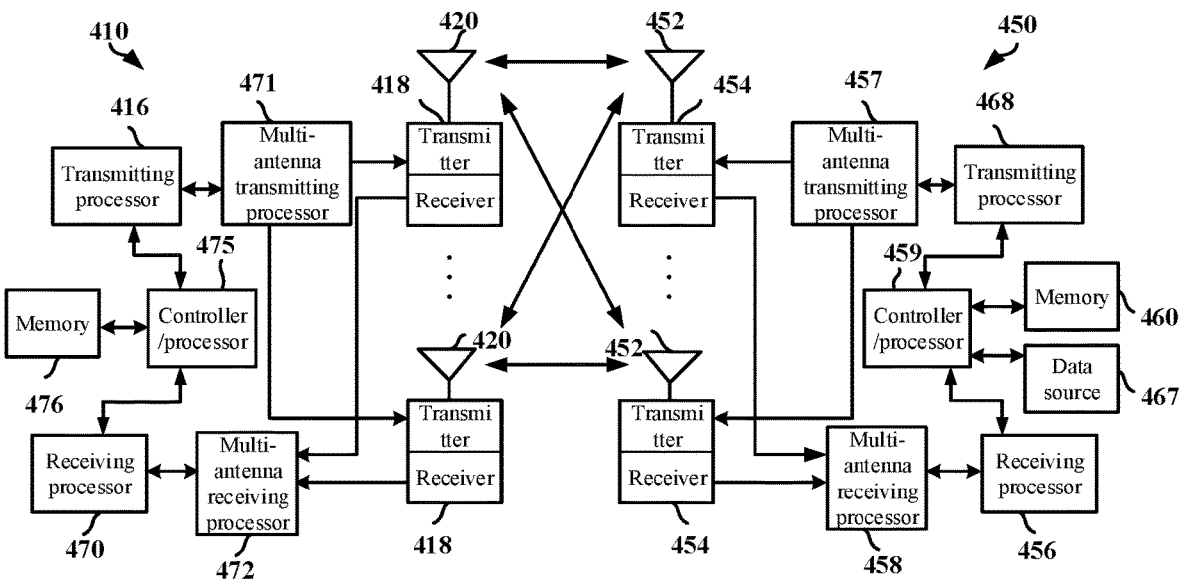
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also responsible for a retransmission of a lost packet, and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multi-carrier symbol stream to be provided to the receiving processor 456. The receiving processor 456 and the multi-antenna receiving processor 458 perform signal processing functions of the L1 layer. The multi-antenna receiving processor 458 performs reception analog precoding/beam-forming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also in charge of a retransmission of a lost packet and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least performs a measurement on a first radio signal, and receives a first signaling; transmits a second radio signal when a first condition is fulfilled; otherwise drops transmitting the second radio signal; wherein, a measurement performed on the first radio signal is used to determine a first measurement value; the first condition comprises a relative magnitude of the first measurement value and a first reference value, and the first condition comprises a relative positional relation between a first geographical location of the first communication device 450 and a reference geographical zone; the first signaling is used to determine the first reference value; the second radio signal is used to determine whether a connection is established with a neighbor node of a transmitter for the first signaling.

In one embodiment, the first communication device 450 comprises a memory that stores computer readable instruction program, the computer readable instruction program generates an action when executed by at least one processor, which includes: performing a measurement on a first radio signal, and receiving a first signaling; transmitting a second radio signal when a first condition is fulfilled; otherwise dropping transmission of the second radio signal; wherein, a measurement performed on the first radio signal is used to determine a first measurement value; the first condition comprises a relative magnitude of the first measurement value and a first reference value, and the first condition comprises a relative positional relation between a first geographical location of the first communication device 450 and a reference geographical zone; the first signaling is used to determine the first reference value; the second radio signal is used to determine whether a connection is established with a neighbor node of a transmitter for the first signaling.

In one embodiment, the structure of the second node is the same as the second communication device 410.

In one embodiment, the second node comprises at least one processor and at least one memory. The at least one memory comprises computer program codes; the at least one memory and the computer program codes are configured to be used in collaboration with the at least one processor. The second node at least transmits a first signaling, and transmits a fourth signal; receives a second radio signal when a first condition is fulfilled; otherwise, drops receiving the second radio signal; and receives a fifth signal; wherein, a measurement performed by a receiver for the first signaling on the first radio signal is used to determine a first measurement value; the first condition comprises a relative magnitude of the first measurement value and a first reference value, and the first condition comprises a relative positional relation between a first geographical location of the receiver for the first signaling and a reference geographical zone; the first signaling is used to determine the first reference value; the second radio signal is used to determine whether a connection is established with a neighbor node of the second node; the fourth signal is used to make a request for establishing a connection between first-type nodes and the said neighbor node of the second node, the first-type nodes include multiple nodes; a measurer for the first radio signal is one of the first-type nodes; the fifth signal is used to acknowledge a connection established between the first-type nodes and the said neighbor node of the second node.

In one embodiment, the second node comprises a memory that stores computer readable instruction program, the computer readable instruction program generates actions when executed by at least one processor, which include: transmitting a first signaling, and transmitting a fourth signal; receiving a second radio signal when a first condition is fulfilled; otherwise, dropping reception of the second radio signal; and receiving a fifth signal; wherein, a measurement performed by a receiver for the first signaling on the first radio signal is used to determine a first measurement value; the first condition comprises a relative magnitude of the first measurement value and a first reference value, and the first condition comprises a relative positional relation between a first geographical location of the receiver for the first signaling and a reference geographical zone; the first signaling is used to determine the first reference value; the second radio signal is used to determine whether a connection is established with a neighbor node of the second node; the fourth signal is used to make a request for establishing a connection between first-type nodes and the said neighbor node of the second node, the first-type nodes include multiple nodes; a measurer for the first radio signal is one of the first-type nodes; the fifth signal is used to acknowledge a connection established between the first-type nodes and the said neighbor node of the second node.

In one embodiment, the structure of the third node is the same as the second communication device 410.

In one embodiment, the third node comprises at least one processor and at least one memory. The at least one memory comprises computer program codes; the at least one memory and the computer program codes are configured to be used in collaboration with the at least one processor. The third node at least transmits a first radio signal, and transmits a fifth signal; and receives a fourth signal; wherein, a measurement performed on the first radio signal is used to determine a first measurement value; the first condition comprises a relative magnitude of the first measurement value and a first reference value, and the first condition comprises a relative positional relation between a first geographical location of the first node and a reference geographical zone; the first signaling is used to determine the first reference value; when a first condition is fulfilled, transmit a second radio signal; otherwise, drop transmitting the second radio signal; the second radio signal is used to determine whether a connection is established between a measurer for the first radio signal and the third node; the fourth signal is used to make a request for establishing a connection between first-type nodes and the third node; the first-type nodes include multiple nodes; a measurer for the first radio signal is one of the first-type nodes; the fifth signal is used to acknowledge a connection established between the first-type nodes and the third node.

In one embodiment, the third node comprises a memory that stores computer readable instruction program, the computer readable instruction program generates actions when executed by at least one processor, which include: transmitting a first radio signal, and transmitting a fifth signal; and receiving a fourth signal; wherein, a measurement performed on the first radio signal is used to determine a first measurement value; the first condition comprises a relative magnitude of the first measurement value and a first reference value, and the first condition comprises a relative positional relation between a first geographical location of the first node and a reference geographical zone; the first signaling is used to determine the first reference value; when a first condition is fulfilled, transmit a second radio signal; otherwise, drop transmitting the second radio signal; the second radio signal is used to determine whether a connection is established between a measurer for the first radio signal and the third node; the fourth signal is used to make a request for establishing a connection between first-type nodes and the third node; the first-type nodes include multiple nodes; a measurer for the first radio signal is one of the first-type nodes; the fifth signal is used to acknowledge a connection established between the first-type nodes and the third node.

In one embodiment, the antenna 452, the receiver 454, the receiving processor 456, and the controller/processor 459 are used to receive a first signaling, first information, second information and third information; at least one of the antenna 420, the transmitter 418, the transmitting processor 416, or the controller/processor 475 is used to transmit a first signaling, first information, second information and third information.

In one embodiment, the antenna 452, the transmitter 454, the transmitting processor 468, and the controller/processor 459 are used to measure a first radio signal and a third radio signal; at least one of the antenna 420, the receiver 418, the receiving processor 470, or the controller/processor 475 is used to transmit a first radio signal and a third radio signal.

In one embodiment, the antenna 452, the transmitter 454, the transmitting processor 468, and the controller/processor

459 are used to transmit a second radio signal; at least one of the antenna 420, the receiver 418, the receiving processor 470, or the controller/processor 475 is used to receive a second radio signal.

In one embodiment, with the second communication device serving as the second node, the antenna 420, the transmitter 418, the transmitting processor 416, and the controller/processor 475 are used to transmit a fourth signal; with the second communication device serving as the third node, at least one of the antenna 420, the receiver 418, the receiving processor 470, or the controller/processor 475 is used to receive a fourth signal.

In one embodiment, with the second communication device serving as the second node, the antenna 420, the receiver 418, the receiving processor 470, and the controller/processor 475 are used to receive a fifth signal; with the second communication device serving as the third node, at least one of the antenna 420, the transmitter 418, the transmitting processor 416, or the controller/processor 475 is used to transmit a fifth signal.

In one embodiment, the first communication device 450 corresponds to the first node in the present disclosure.

In one embodiment, the second communication device 410 corresponds to the second node in the present disclosure.

In one embodiment, the second communication device 410 corresponds to the third node in the present disclosure.

In one embodiment, the first communication device 450 is a UE.

In one embodiment, the first communication device 450 is a UE supporting large delay difference.

In one embodiment, the first communication device 450 is a UE supporting NTN.

In one embodiment, the first communication device 450 is an aircraft.

In one embodiment, the first communication device 450 is capable of positioning.

In one embodiment, the first communication device 450 is incapable of positioning.

In one embodiment, the second communication device 410 is a base station (gNB/eNB/ng-eNB).

In one embodiment, the second communication device 410 is a base station supporting large delay difference.

In one embodiment, the second communication device 410 is a base station supporting NTN.

In one embodiment, the second communication device 410 is satellite equipment.

In one embodiment, the second communication device 410 is a flight platform.

Embodiment 5

Figure 5:
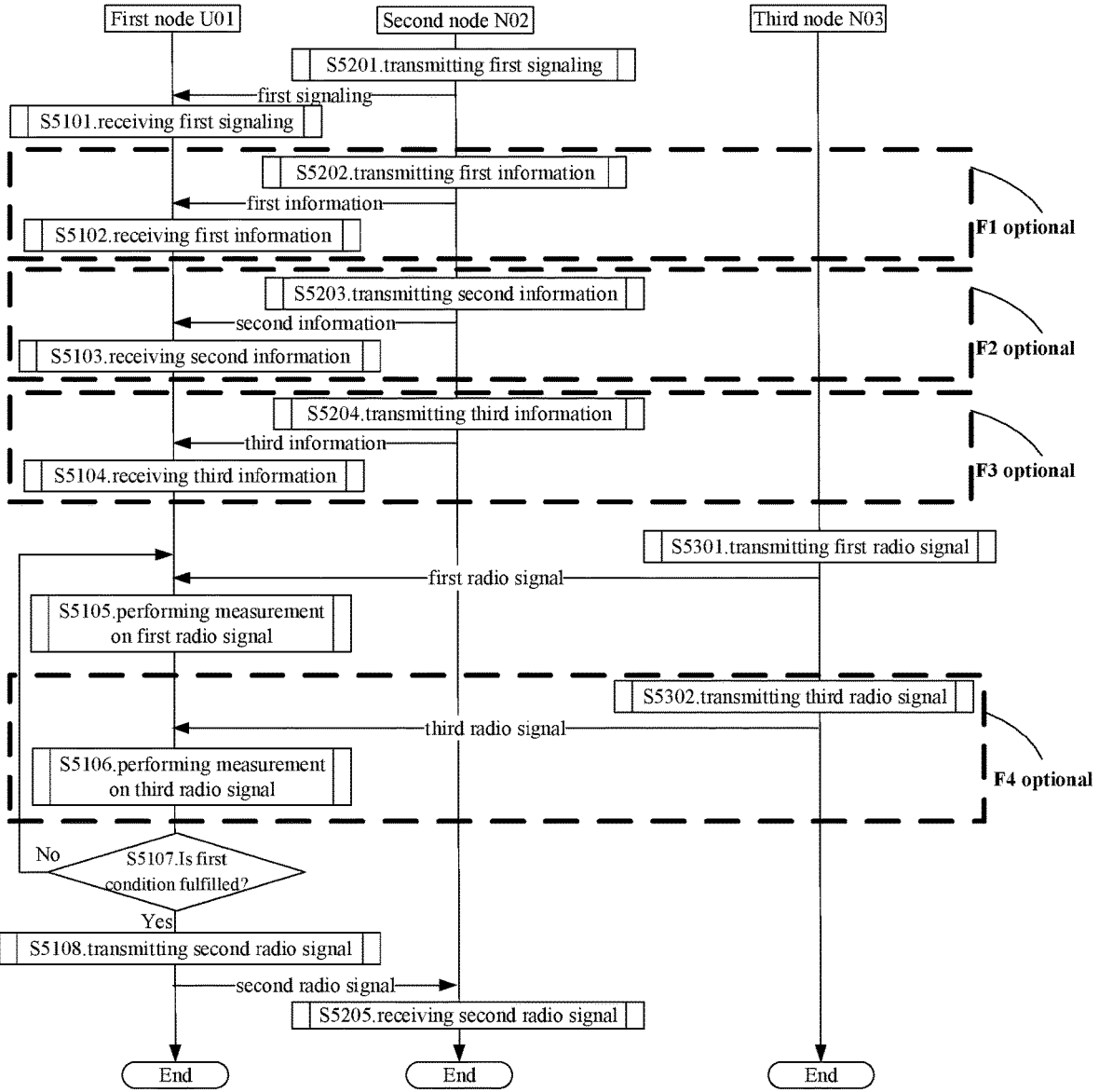
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. A second node N02 is a source base station for a first node U01, and a third node N03 is a target base station for handover of the first node U01. It should be particularly noted that the sequence illustrated herein does not set any limit to the signal transmission order or implementation order in the present disclosure.

The first node U01 receives a first signaling in step S5101, receives first information in step S5102, and receives second information in step S5103; receives third information in step S5104, measures a first radio signal in step S5105; and measures a third radio signal in step S5106; and determines whether a measurement result fulfills a first condition in step S5107, if so, transmits a second radio signal in step S5108, otherwise, drops transmitting the second radio signal in step S5108.

The second node N02 transmits a first signaling in step S5201; transmits first information in step S5202; and transmits second information in step S5203; transmits third information in step S5204; and receives a second radio signal in step S5205.

The third node N03 transmits a first radio signal in step S5301, and transmits a third radio signal in step S5302.

In Embodiment 5, a measurement performed on the first radio signal in the present disclosure is used to determine a first measurement value; the first condition comprises a relative magnitude of the first measurement value and the first reference value, the first condition also comprises a relative positional relation between a first geographical location of the first node U01 and a reference geographical zone; the first signaling is used to determine the first reference value; the second radio signal is used to determine whether a connection is established with the third node N03; a measurement performed on the third radio signal is used to determine a second measurement value; the first condition comprises a relative magnitude of the second measurement value and the second reference value, or, the second measurement value is used to determine the first reference value; when the first condition comprises a relative magnitude of the second measurement value and the second reference value, the first signaling is used to determine the second reference value; the first condition is one of K candidate conditions, the first information being used to determine the first condition from the K candidate conditions; the K conditions are pre-defined, or are configurable; the K is a positive integer; the second information is used to determine the reference geographical zone; when the first condition is fulfilled, the first geographical location of the first node U01 is at an edge of the reference geographical zone; the third information is used to indicate whether a measurement on the first radio signal is performed; when the first geographical location of the first node U01 is in an inner part of the reference geographical zone, the third information is used to indicate that no measurement on the first radio signal is performed; when the first geographical location of the first node U01 is at an edge of the reference geographical zone, the third information is used to indicate that a measurement on the first radio signal is performed; the third information occupies 1 information bit.

In one embodiment, the first node U01 is a UE.

In one embodiment, the second node N02 is a maintenance base station for a serving cell of the first node UOL In one embodiment, the second node N02 is a Source eNB.

In one embodiment, the third node N03 is a Target eNB for handover.

In one embodiment, the third node N03 is a neighbor node of the second node N02.

In one embodiment, the NTN base station is one of Geostationary Earth Orbiting (GEO) satellite, Medium Earth Orbiting (MEO) satellite, Low Earth Orbit (LEO) satellite, Highly Elliptical Orbiting (HEO) satellite or an Airborne Platform.

In one embodiment, a transmitter for the first radio signal in the present disclosure includes the second node N02.

In one embodiment, a transmitter for the first radio signal includes a neighbor node of the second node N02.

In one embodiment, a transmission frequency for the first radio signal is the same as a transmission frequency for the serving cell of the first node UOL In one embodiment, a transmission frequency for the first radio signal is different from a transmission frequency for the serving cell of the first node UOL In one embodiment, the first radio signal is used by the first node U01 for performing a measurement on a neighboring cell.

In one embodiment, the first radio signal is used by the first node U01 for performing a measurement on a serving cell.

In one embodiment, a receiver for the second radio signal is a maintenance base station for a serving cell for the first node UOL In one embodiment, the second radio signal is a higher layer signal.

In one embodiment, the second radio signal comprises all or part of a higher-layer signal.

In one embodiment, the second radio signal comprises all or part of a Radio Resource Control (RRC) message.

In one embodiment, the second radio signal is a MeasurementReport Message, the MeasurementReport Message being used to indicate a Measurement Result of the first node U01.

In one embodiment, a transmitter for the third radio signal includes a neighbor node of the second node N02.

In one embodiment, a transmitter for the third radio signal includes the second node N02.

In one embodiment, the third radio signal is transmitted by an air interface.

In one embodiment, the third radio signal is transmitted by a radio interface.

In one embodiment, the third radio signal is a physical layer signal.

In one embodiment, the third radio signal is a baseband signal.

In one embodiment, the third radio signal is a radio frequency signal.

In one embodiment, a transmission frequency for the third radio signal is the same as a transmission frequency for the serving cell of the first node U01.

In one embodiment, a transmission frequency for the third radio signal is different from a transmission frequency for the serving cell of the first node U01.

In one embodiment, the third radio signal is used by the first node U01 for performing a measurement on a neighboring cell.

In one embodiment, the third radio signal is used by the first node U01 for performing a measurement on a serving cell.

In one embodiment, the third radio signal is a Reference Signal (RS).

In one embodiment, the third radio signal is a Synchronizing Signal (SS).

In one embodiment, the third radio signal is one of Cell-specific reference signals (CSRS), Channel Status Information (CSI), reference signals (RS), a Synchronizing Signal (SS)/Broadcast Channel (PBCH).

In one embodiment, a transmitter for the first radio signal and a transmitter for the third radio signal are a same node.

In one embodiment, a transmitter for the first radio signal and a transmitter for the third radio signal are not a same node.

In one embodiment, a measurement quantity for the first radio signal and a measurement quantity for the third radio signal are the same.

In one embodiment, a measurement quantity for the first radio signal and a measurement quantity for the third radio signal are different.

In one embodiment, when a transmitter for the third radio signal is a maintenance base station for a serving cell for the first node U01, the first measurement value is used to determine a signal quality of a serving cell for the first node U01.

In one embodiment, the phrase that the second measurement value is used to determine the first reference value comprises a meaning that the first condition comprises a relative magnitude of the first measurement value and the first reference value, where the first reference value is determined by the second measurement value.

In one embodiment, a Measurement Quantity for the third radio signal is used to determine the first measurement value.

In one embodiment, a Measurement Quantity for the third radio signal is used to determine the second measurement value.

In one embodiment, the Measurement Quantity comprises any one of an RSRP, an RSRQ, a SINR or a UE Location.

In one embodiment, a measurement quantity corresponding to the first measurement value is the same as a measurement quantity corresponding to the second measurement value.

In one embodiment, a measurement quantity corresponding to the first measurement value is different from a measurement quantity corresponding to the second measurement value.

In one embodiment, the first measurement value and the first reference value are measured in a same unit.

In one embodiment, the second measurement value and the second reference value are measured in a same unit.

In one embodiment, the second measurement value comprises an RSRQ obtained by measurements performed on the first radio signal.

In one embodiment, the second measurement value comprises an RSRP obtained by measurements performed on the first radio signal.

In one embodiment, the second measurement value comprises an SINR obtained by measurements performed on the first radio signal.

In one embodiment, the first reference value comprises a frequency specific offset.

In one embodiment, the first reference value comprises a cell specific offset.

In one embodiment, the first condition comprises a relative magnitude of the second measurement value and the first measurement value.

In one embodiment, the first condition comprises a relative magnitude of the second measurement value and the second reference value.

In one embodiment, the first condition comprises a relative magnitude of the second measurement value and the second reference value and a relative positional relation between the first geographical location and the reference geographical zone.

In one embodiment, the first condition simultaneously comprises a relative magnitude of the first measurement value and the first reference value and a relative magnitude of the second measurement value and the second reference value.

In one embodiment, the first condition comprises that a first measurement value of the serving cell measured by the first node U01 is higher than the first reference value.

In one embodiment, the first condition comprises that a first measurement value of the serving cell measured by the first node U01 is lower than the first reference value.

In one embodiment, the first condition comprises that a first measurement value of the neighboring cell measured by the first node U01 is higher than the first reference value.

In one embodiment, the first condition comprises that a first measurement value of the neighboring cell measured by the first node U01 is higher than a second measurement value of a serving cell measured by the first node U01.

In one embodiment, the first condition comprises that the first measurement value measured by the first node U01 for the first radio signal is lower than the first reference value, while the second measurement value measured for the second radio signal is higher than the second reference value.

In one embodiment, the first condition comprises any combination of the above embodiments pertinent to the first condition.

In one embodiment, the first signaling is broadcast.

In one embodiment, the first signaling is groupcast.

In one embodiment, the first signaling is unicast.

In one embodiment, the first signaling is Cell-Specific.

In one embodiment, the first signaling is UE-Specific.

In one embodiment, the first signaling is transmitted via an air interface.

In one embodiment, the first signaling is transmitted via a Uu interface.

In one embodiment, the first signaling is transmitted via a radio interface.

In one embodiment, the first signaling is a higher layer signaling.

In one embodiment, the first signaling comprises all or part of a Higher Layer signaling.

In one embodiment, the first signaling is an RRC signaling.

In one embodiment, the first signaling comprises all or part of an RRC message.

In one embodiment, the first signaling comprises all or part of an RRCConnectionReconfiguration message.

In one embodiment, the first signaling comprises all or part of an RRCConnectionResume message.

In one embodiment, the first signaling is used to determine the first condition.

In one embodiment, the first signaling is used to determine the first reference value.

In one embodiment, the first signaling is used to determine the second reference value.

In one embodiment, the first signaling is used to determine the first reference value and the second reference value.

In one embodiment, the first signaling is used to determine a relative magnitude of the first measurement value and the first reference value.

In one embodiment, the first signaling is used to determine a relative positional relation between the first geographical location and the reference geographical zone.

In one embodiment, the first signaling is used to determine a relative magnitude of the first measurement value and the first reference value and a relative positional relation between the first geographical location and the reference geographical zone.

In one embodiment, the first signaling comprises a triggerQuantity IE.

In one embodiment, the triggerQuantity comprises one of an RSRP, an RSRQ, a SINR or a UE Location.

In one embodiment, the triggerQuantity comprises any two of an RSRP, an RSRQ, a SINR or a UE Location.

In one embodiment, the triggerQuantity comprises any three of an RSRP, an RSRQ, a SINR or a UE Location.

In one embodiment, the triggerQuantity comprises an RSRP, an RSRQ, a SINR and a UE Location.

In one embodiment, the UE Location comprises the first geographical location.

In one embodiment, the UE Location comprises the reference geographical zone.

In one embodiment, the UE Location comprises an identifier for the reference geographical zone.

In one embodiment, a receiver for the first information is a first node U01.

In one embodiment, a transmitter for the first information is a maintenance base station for a serving cell for the first node U01.

In one embodiment, the first information is higher-layer information.

In one embodiment, the first information comprises all or part of a Higher Layer message.

In one embodiment, the first information comprises all or part of an RRC message.

In one embodiment, the first information comprises all or part of a RRCConnectionReconfiguration message.

In one embodiment, the first information comprises all or part of a RRCConnectionResume message.

In one embodiment, the first information comprises one of a ReportConfigEUTRA IE, a ReportConfig IE, a ReportConfigNR IE, a ReportConfigInterRAT IE or a ReportConfigToAddModList IE.

In one embodiment, the second information is higher-layer information.

In one embodiment, the second information comprises all or part of a Higher Layer message.

In one embodiment, the second information comprises all or part of an RRC message.

In one embodiment, the second information comprises all or part of a RRCConnectionReconfiguration message.

In one embodiment, the second information comprises all or part of a RRCConnectionResume message.

In one embodiment, the second information comprises a longitudinal interval and a dimensional interval for the reference geographical zone.

In one embodiment, the second information comprises both length and width of the reference geographical zone.

In one embodiment, the second information comprises an identifier of the reference geographical zone.

In one embodiment, the third information is an RRC signaling.

In one embodiment, the third information comprises all or part of an RRC message.

In one embodiment, the third information comprises all or part of a RRCConnectionReconfiguration message.

In one embodiment, the third information comprises all or part of a RRCConnectionResume message.

In one embodiment, the third information is used for indicating whether a measurement is performed on a first radio signal.

In one embodiment, when the first geographical location of the first node U01 is in an inner position of the reference geographical zone, the third information is used for indicating that no measurement is performed on a first radio signal.

In one embodiment, when the first geographical location of the first node U01 is at an edge/peripheral position of the reference geographical zone, the third information is used for indicating that a measurement is performed on a first radio signal.

In one embodiment, the third information occupies 1 information bit.

In one embodiment, the first information and the second information are a same message.

In one embodiment, the first information and the third information are a same message.

In one embodiment, the second information and the third information are a same message.

In one embodiment, the first information, the second information and the third information are a same message.

In one embodiment, the first information is partial fields in the first signaling.

In one embodiment, the second information is partial fields in the first signaling.

In one embodiment, the third information is partial fields in the first signaling.

In one embodiment, the dotted-line box F1 does not exist.

In one embodiment, the dotted-line box F2 does not exist.

In one embodiment, the dotted-line box F3 does not exist.

In one embodiment, the dotted-line box F4 does not exist.

In one embodiment, the dotted-line boxes F1, F2, F3 and F4 all exist.

Embodiment 6

Figure 6:
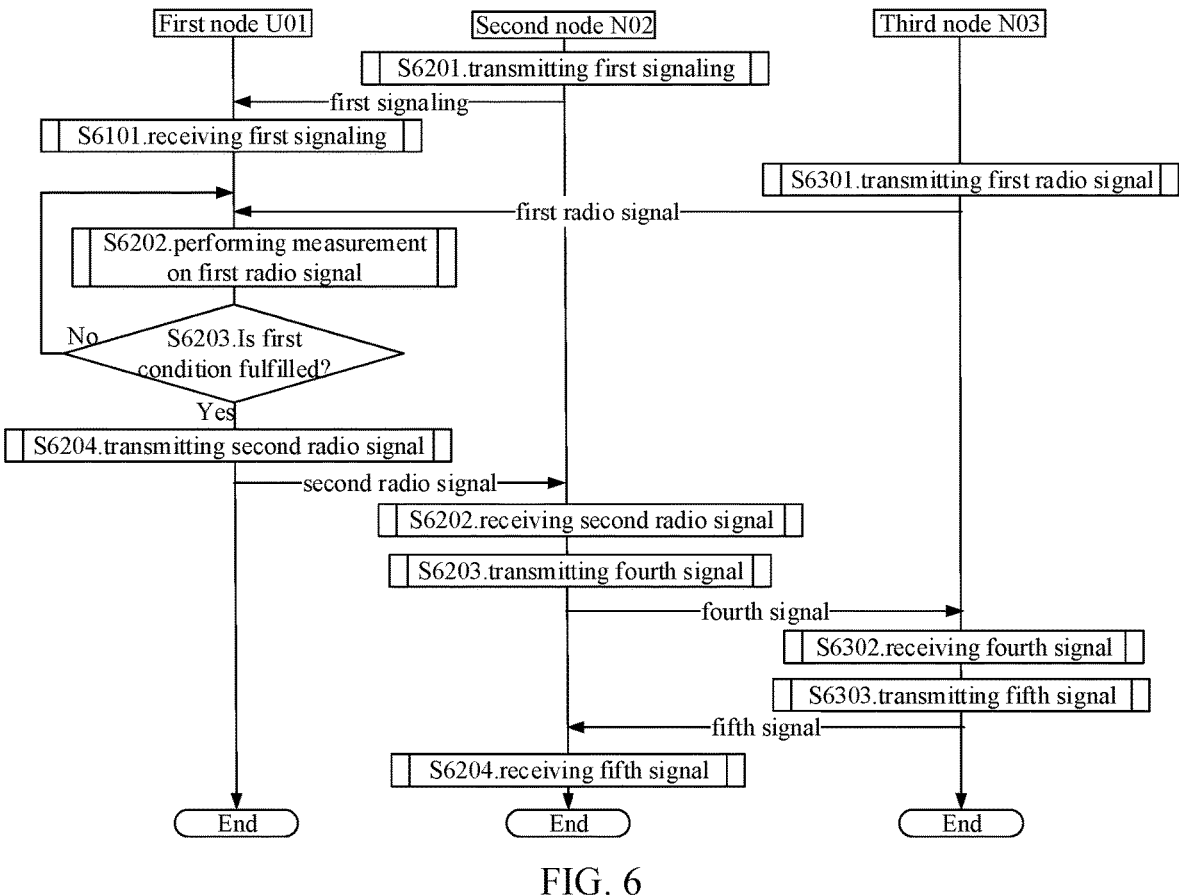
FIG. 6 illustrates a flowchart of radio signal transmission according to another embodiment of the present disclosure.

Embodiment 6 illustrates a flowchart of signal transmission according to another embodiment of the present disclosure, as shown in FIG. 6. A second node N02 is a source base station for a first node U01, and a third node N03 is a target base station for handover of the first node U01. It should be particularly noted that the sequence illustrated herein does not set any limit to the signal transmission order or implementation order in the present disclosure.

The first node U01 receives a first signaling in step S6101, measures a first radio signal in step S6102, and determines whether a measurement result fulfills a first condition step S6103; if so, transmits a second radio signal in step S6104, otherwise, drops transmitting the second radio signal in step S6104.

The second node N02 transmits a first signaling in step S6201; and receives a second radio signal in step S6202; transmits a fourth signal in step S6203; and receives a fifth signal in step S6204.

The third node N03 transmits a first radio signal in step S6301; receives a fourth signal in step S6302; and transmits a fifth signal in step S6303.

In one embodiment, a measurement performed on the first radio signal is used to determine a first measurement value; the first condition comprises a relative magnitude of the first measurement value and a first reference value, and the first condition comprises a relative positional relation between a first geographical location of the first node U01 and a reference geographical zone; the first signaling is used to determine the first reference value; the second radio signal is used to determine whether a connection is established with the third node N03; the fourth signal is used to make a request for establishing a connection between first-type nodes within the reference geographical zone and the third node N03, the first-type nodes include multiple nodes; the first node is one of the first-type nodes; the fifth signal is used to acknowledge a connection established between the first-type nodes and the said neighbor node of the receiver for the first signaling.

In one embodiment, the first radio signal is a Reference Signal (RS).

In one embodiment, the first signaling is a Measurement Configuration Message.

In one embodiment, the second radio signal is a Measurement Configuration Message.

In one embodiment, the phrase that the second radio signal is used to determine whether a connection is established with the third node N03 has a meaning that when a measurement report by the first node U01 fulfills a handover condition, the second node N02 decides to performs handover of the first node U01.

In one embodiment, the fourth signal is transmitted via an X2 Interface, where the X2 Interface is used for signal transmissions between two base stations (i.e., eNB).

In one embodiment, the fourth signal is transmitted via an Xn Interface, where the Xn Interface is used for signal transmissions between two Next Generation Radio Access Network (NG-RAN) nodes.

In one embodiment, an interface between the second node N02 and the third node N03 is an X2 interface.

In one embodiment, the fourth signal comprises a Handover Request Message.

In one embodiment, the fourth signal also comprises UE X2 signaling Context, UE S1 EPC signaling context, a Target Cell ID, RRC Context, AS-configuration, E-RAB Context and a physical layer ID.

In one embodiment, the first-type nodes include M nodes, where M is a positive integer.

In one embodiment, the M nodes among the first-type nodes are all located within the reference geographical zone.

In one embodiment, the RRC Context comprises M Cell-Radio Network Temporary Identifiers (C-RNTIs), the M C-RNTIs respectively corresponding to the M nodes among the first-type nodes.

In one embodiment, the C-RNTI is used to determine a unique identifier that distinguishes RRC connections and schedulings for different UEs in a cell.

In one embodiment, the fifth signal is transmitted via an X2 Interface.

In one embodiment, the fifth signal is transmitted via an Xn Interface.

In one embodiment, the fifth signal comprises a HANDOVER REQUEST ACKNOWLEDGE Message.

In one embodiment, the fifth signal comprises N new C-RNTIs, the N new C-RNTIs respectively corresponding to the N nodes among the first-type nodes, where N is a positive integer.

In one embodiment, the fifth signal also comprises a target base station security algorithm identifier.

In one embodiment, the fifth signal also comprises N dedicated Random Access Channel (RACH) Preambles, the N RACH Preambles respectively corresponding to the N nodes among the first-type nodes.

In one embodiment, the N said RACH Preambles are respectively used by the N nodes for performing a Random Access procedure.

In one embodiment, M is equal to N.

In one embodiment, M is greater than N.

In one embodiment, when the M is greater than N, which means that only N nodes among the M nodes can perform handovers, so a number of nodes incapable of performing handover is a difference between M and N.

In one embodiment, the fifth signal comprises a HANDOVER PREPARATION FAILURE message.

In one embodiment, the HANDOVER PREPARATION FAILURE message comprises a Cause IE, where the Cause IE is used to indicate a specific event that determines a handover preparation failure.

Embodiment 7

Figure 7:
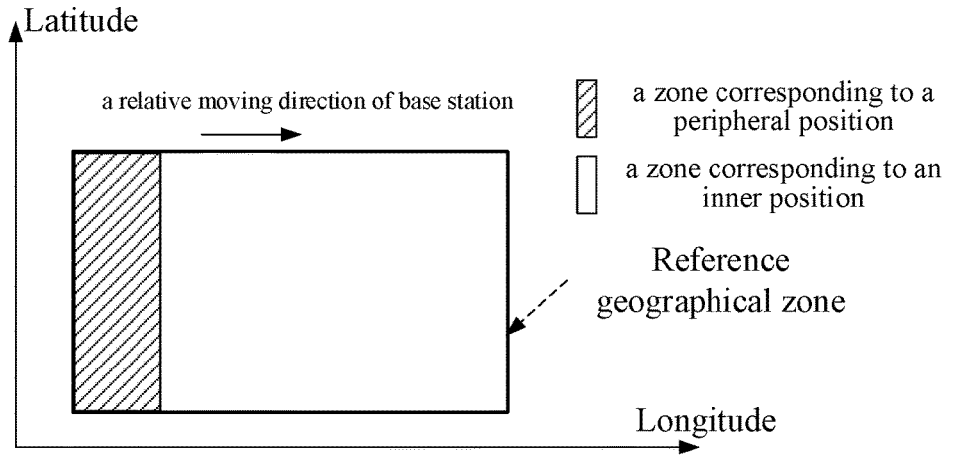
FIG. 7 illustrates a schematic diagram of an inner position and a peripheral position in a reference geographical zone according to one embodiment of the present disclosure.

Embodiment 7 illustrates a schematic diagram of an inner position and a peripheral position in a reference geographical zone according to one embodiment of the present disclosure; as show in FIG. 7. The horizontal axis represents the longitude while the vertical axis represents the latitude.

In Embodiment 7, the thick-line rectangle represents the reference geographical zone, a longitudinal interval is used to determine a length of the reference geographical zone, while a latitudinal interval is used to determine a width of the reference geographical zone. The arrow with a solid line represents a relative moving direction of the base station; the rectangle filled with oblique lines represents a zone corresponding to a peripheral position of the reference geographical zone; the blank rectangle represents an inner position of the reference geographical zone.

In one embodiment, the reference geographical zone consists of two parts: a zone corresponding to the peripheral position and a zone corresponding to the inner position.

In one embodiment, the rectangle filled with oblique lines represents a zone corresponding to a peripheral position of the reference geographical zone.

In one embodiment, the blank rectangle represents a zone corresponding to an inner position of the reference geographical zone.

In one embodiment, a peripheral position and the inner position of the reference geographical zone are related to a relative moving direction of a base station.

In one embodiment, second information is used to determine the reference geographical zone.

In one embodiment, the second information is used to determine a zone corresponding to the peripheral position and a zone corresponding to the inner position of the reference geographical zone.

In one embodiment, size of the reference geographical zone is configurable.

In one embodiment, size of the reference geographical zone is fixed.

In one embodiment, the reference geographical zone is a zone.

In one embodiment, a zone corresponding to a peripheral position of the reference geographical zone is configurable.

In one embodiment, a zone corresponding to an inner position of the reference geographical zone is configurable.

In one embodiment, a zone area corresponding to a peripheral position of the reference geographical zone is related to a type of the base station.

In one embodiment, a zone area corresponding to a peripheral position of the reference geographical zone is related to a height of the base station.

In one embodiment, the higher the base station, the larger a zone area corresponding to a peripheral position of the reference geographical zone.

Embodiment 8

Embodiment 8 illustrates a schematic diagram of a relative positional relation between a first geographical location and a reference geographical zone according to one embodiment of the present disclosure; as show in FIG. 8. The horizontal axis represents the longitude while the vertical axis represents the latitude.

In FIG. 8, the thick-line rectangle represents the reference geographical zone, the rectangle filled with oblique lines represents a zone corresponding to a peripheral position of the reference geographical zone, while the blank rectangle represents a zone corresponding to an inner part of the reference geographical zone; the intervals of longitude from A1 to A2 represent a length of the reference geographical zone, while the intervals of latitude from B1 to B2 represent a width of the reference geographical zone, an arrow with solid line in the direction of the longitude represents a moving direction of the base station relative to the UE; the left of the reference geographical zone is used to determine a reference line; the d0 is used to determine a first distance threshold; in FIG. 8(a), the first node is in a rectangular zone filled with oblique lines, and a distance from the first node to the reference line is d1; in FIG. 8(b), the first node is in a rectangular zone which is blank, and a distance from the first node to the reference line is d2.

In one embodiment, the left of the rectangle filled with oblique lines is used to determine the reference line.

In one embodiment, the longitudinal interval in the rectangle filled with oblique lines is used to determine the first distance threshold.

In one embodiment, the longitude and latitude are used to determine the first geographical location of the first node.

In one embodiment, a longitudinal interval and a dimensional interval are used to determine a size of the reference geographical zone of the first node.

In one embodiment, the fact that a distance between the first geographical location of the first node and the reference line is no larger than the first distance threshold is used to determine that the first node is in an edge/peripheral position of the reference geographical zone.

In one embodiment, the fact that a distance between the first geographical location of the first node and the reference line is larger than the first distance threshold is used to determine that the first node is in an inner position of the reference geographical zone.

In one embodiment, as illustrated in FIG. 8(a), the first node is located in the peripheral position of the reference geographical zone, where d1 is less than d0.

In one embodiment, as illustrated in FIG. 8(b), the first node is located in the inner position of the reference geographical zone, where d2 is greater than d0.

In one embodiment, the first distance threshold is used to determine a zone corresponding to the peripheral position and a zone corresponding to the inner position of the reference geographical zone.

In one embodiment, the first distance threshold is configurable.

In one embodiment, the first distance threshold is default.

In one embodiment, the first distance threshold is fixed.

Embodiment 9

Embodiment 9 illustrates a schematic diagram of first information used to determine a first condition from K candidate conditions according to one embodiment of the present disclosure, as shown in FIG. 9.

In Embodiment 9, the first condition is one of K candidate conditions, the first information is used to determine the first condition out of the K candidate conditions; the K candidate conditions are pre-defined, or the K candidate conditions are configurable; where K is a positive integer.

In one embodiment, the K candidate conditions are used to determine K measurement report triggering events.

In one embodiment, the first information comprises a positioning capability of the first node.

In one embodiment, when the first node has a positioning capability, the first condition comprises a relation between the first geographical location of the first node and the reference geographical zone.

In one embodiment, when the first node has no positioning capability, the first condition does not comprise a relation between the first geographical location of the first node and the reference geographical zone.

In one embodiment, the first information comprises a type of a maintenance base station for a serving cell of the first node.

In one embodiment, when a maintenance base station for a serving cell of the first node is an NTN base station, the first condition comprises a relation between the first geographical location of the first node and the reference geographical zone.

In one embodiment, when a maintenance base station for a serving cell of the first node is a TN base station, the first condition does not comprise a relation between the first geographical location of the first node and the reference geographical zone.

Embodiment 10

Embodiment 10 illustrates a structure block diagram of a processing device used in a first node according to one embodiment of the present disclosure; as shown in FIG. 10. In FIG. 10, a processing device 1000 in the first node is comprised of a first receiver 1001 and a first transmitter 1002.

The first receiver 1001 performs a measurement on a first radio signal, and receives a first signaling;

the first transmitter 1002 transmits a second radio signal when a first condition is fulfilled; otherwise, drops transmission of the second radio signal.

In Embodiment 10, a measurement performed on the first radio signal is used to determine a first measurement value; the first condition comprises a relative magnitude of the first measurement value and a first reference value, and the first condition comprises a relative positional relation between a first geographical location of the first node and a reference geographical zone; the first signaling is used to determine the first reference value; the second radio signal is used to determine whether a connection is established with a neighbor cell of a serving cell for the first node.

In one embodiment, the first receiver 1001 performs a measurement on a third radio signal; wherein, the measurement performed on the third radio signal is used to determine a second measurement value; the first condition comprises a relative magnitude of the second measurement value and a second reference value, or the second measurement value is used to determine the first reference value; when the first condition comprises a relative magnitude of the second measurement value and the second reference value, the first signaling is used to determine the second reference value.

In one embodiment, the first receiver 1001 receives first information; wherein, the first condition is one of K candidate conditions, the first information is used to determine the first condition out of the K candidate conditions; the K candidate conditions are pre-defined, or the K candidate conditions are configurable; where K is a positive integer.

In one embodiment, the first receiver 1001 receives second information; wherein, the second information is used to determine the reference geographical zone.

In one embodiment, when the first condition is fulfilled, the first geographical location of the first node is at an edge/peripheral position of the reference geographical zone.

In one embodiment, the first receiver 1001 receives third information; wherein, the third information is used for indicating whether a measurement is performed on the first radio signal; when the first geographical location of the first node is in an inner part of the reference geographical zone, the third information is used for indicating that no measurement is performed on the first radio signal; when the first geographical location of the first node is at an edge/peripheral position of the reference geographical zone, the third information is used for indicating that a measurement is performed on the first radio signal; the third information occupies 1 information bit.

In one embodiment, the first receiver 1001 comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1001 comprises the antenna 452, the receiver 454, the multi-antenna receiving processor 458 and the receiving processor 456 in FIG. 4 of the present disclosure.

In one embodiment, the first receiver 1001 comprises the antenna 452, the receiver 454 and the receiving processor 456 in FIG. 4 of the present disclosure.

In one embodiment, the first transmitter 1002 comprises the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1002 comprises the antenna 452, the transmitter 454, the multi-antenna transmitting processor 457 and the transmitting processor 468 in FIG. 4 of the present disclosure.

In one embodiment, the first transmitter 1002 comprises the antenna 452, the transmitter 454 and the transmitting processor 468 in FIG. 4 of the present disclosure.

Embodiment 11

Embodiment 11 illustrates a structure block diagram of a processing device used in a second node according to one embodiment of the present disclosure; as shown in FIG. 11. In FIG. 11, a processing device 1100 in a second node is comprised of a second transmitter 1101 and a second receiver 1102.

The second transmitter 1101 transmits a first signaling, and transmits a fourth signal;

the second receiver 1102 receives a second radio signal when a first condition is fulfilled; otherwise, drops reception of the second radio signal; and receives a fifth signal.

In Embodiment 11, a measurement performed by a receiver for the first signaling on the first radio signal is used to determine a first measurement value; the first condition comprises a relative magnitude of the first measurement value and a first reference value, and the first condition comprises a relative positional relation between a first geographical location of the receiver for the first signaling and a reference geographical zone; the first signaling is used to determine the first reference value; the second radio signal is used to determine whether a connection is established with a neighbor node of the second node; the fourth signal is used to make a request for establishing a connection between first-type nodes and the said neighbor node of the second node, the first-type nodes include multiple nodes; a measurer for the first radio signal is one of the first-type nodes; the fifth signal is used to acknowledge a connection established between the first-type nodes and the said neighbor node of the second node.

In one embodiment, a receiver for the first signaling performs a measurement on a third radio signal; wherein, the measurement performed on the third radio signal is used to determine a second measurement value; the first condition comprises a relative magnitude of the second measurement value and a second reference value, or the second measurement value is used to determine the first reference value; when the first condition comprises a relative magnitude of the second measurement value and the second reference value, the first signaling is used to determine the second reference value.

In one embodiment, the second transmitter 1101 transmits first information; wherein, the first condition is one of K candidate conditions, the first information is used to determine the first condition out of the K candidate conditions; the K candidate conditions are pre-defined, or the K candidate conditions are configurable; where K is a positive integer.

In one embodiment, the second transmitter 1101 transmits second information; wherein, the second information is used to determine the reference geographical zone.

In one embodiment, when the first condition is fulfilled, the first geographical location of a receiver for the first signaling is at an edge/peripheral position of the reference geographical zone.

In one embodiment, the second transmitter 1101 transmits third information; wherein, the third information is used for indicating whether a measurement is performed on the first radio signal; when the first geographical location of a receiver for the signaling is in an inner part of the reference geographical zone, the third information is used for indicating that no measurement is performed on the first radio signal; when the first geographical location of the receiver for the first signaling is at an edge/peripheral position of the reference geographical zone, the third information is used for indicating that a measurement is performed on the first radio signal; the third information occupies 1 information bit.

In one embodiment, the second transmitter 1101 comprises the antenna 420, the transmitter 418, the multi-antenna transmitting processor 471, the transmitting processor 416, the controller/processor 475 and the memory 476 in FIG. 4 of the present disclosure.

In one embodiment, the second transmitter 1101 comprises the antenna 420, the transmitter 418, the multi-antenna transmitting processor 471 and the transmitting processor 416 in FIG. 4 of the present disclosure.

In one embodiment, the second transmitter 1101 comprises the antenna 420, the transmitter 418 and the transmitting processor 416 in FIG. 4 of the present disclosure.

In one embodiment, the second receiver 1102 comprises the antenna 420, the receiver 418, the multi-antenna receiving processor 472, the receiving processor 470, the controller/processor 475 and the memory 476 in FIG. 4 of the present disclosure.

In one embodiment, the second receiver 1102 comprises the antenna 420, the receiver 418, the multi-antenna receiving processor 472 and the receiving processor 470 in FIG. 4 of the present disclosure.

In one embodiment, the second receiver 1102 comprises the antenna 420, the receiver 418 and the receiving processor 470 in FIG. 4 of the present disclosure.

Embodiment 12

Figure 12:
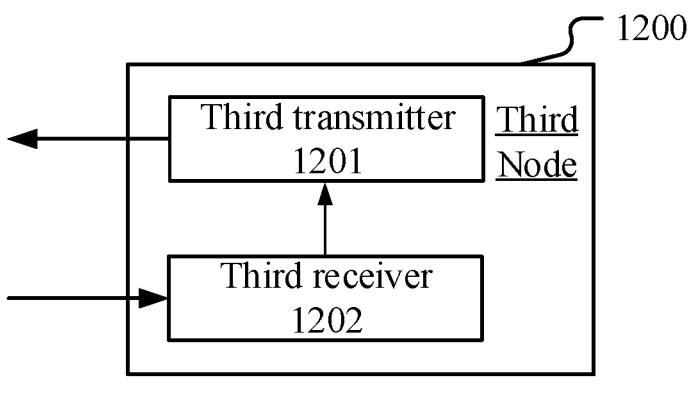
FIG. 12 illustrates a structure block diagram of a processing device used in a third node according to one embodiment of the present disclosure.

Embodiment 12 illustrates a structure block diagram of a processing device used in a third node according to one embodiment of the present disclosure; as shown in FIG. 12. In FIG. 12, a processing device 1200 in the third node is comprised of a third transmitter 1201 and a third receiver 1202.

The third transmitter 1201 transmits a first radio signal, and transmits a fifth signal;

the third receiver 1202 receives a fourth signal.

In Embodiment 13, a measurement performed on the first radio signal is used to determine a first measurement value; the first condition comprises a relative magnitude of the first measurement value and a first reference value, and the first condition comprises a relative positional relation between a first geographical location of the first node and a reference geographical zone; the first signaling is used to determine the first reference value; when a first condition is fulfilled, transmit a second radio signal; otherwise, drop transmitting the second radio signal; the second radio signal is used to determine whether a connection is established between a measurer for the first radio signal and the third node; the fourth signal is used to make a request for establishing a connection between first-type nodes and the third node; the first-type nodes include multiple nodes; a measurer for the first radio signal is one of the first-type nodes; the fifth signal is used to acknowledge a connection established between the first-type nodes and the third node.

In one embodiment, a measurement performed on the first radio signal is used to determine a first measurement value; the first condition comprises a relative magnitude of the first measurement value and a first reference value, and the first condition comprises a relative positional relation between a first geographical location of the first node and a reference geographical zone; the first signaling is used to determine the first reference value; the second radio signal is used to determine whether a measurer for the first radio signal is to establish a connection with the third node.

In one embodiment, the third transmitter 1201 transmits a third radio signal; wherein, the measurement performed on the third radio signal is used to determine a second measurement value; the first condition comprises a relative magnitude of the second measurement value and a second reference value, or the second measurement value is used to determine the first reference value; when the first condition comprises a relative magnitude of the second measurement value and the second reference value, the first signaling is used to determine the second reference value.

In one embodiment, a measurer for the first radio signal receives first information; wherein, the first condition is one of K candidate conditions, the first information is used to determine the first condition out of the K candidate conditions; the K candidate conditions are pre-defined, or the K candidate conditions are configurable; where K is a positive integer.

In one embodiment, a measurer for the first radio signal receives second information; wherein, the second information is used to determine the reference geographical zone.

In one embodiment, when the first condition is fulfilled, the first geographical location of a measurer for the first radio signal is at an edge/peripheral position of the reference geographical zone.

In one embodiment, a measurer for the first radio signal receives third information; wherein, the third information is used for indicating whether a measurement is performed on the first radio signal; when the first geographical location of a measurer for the first radio signal is in an inner part of the reference geographical zone, the third information is used for indicating that no measurement is performed on the first radio signal; when the first geographical location of the measurer for the first radio signal is at an edge/peripheral position of the reference geographical zone, the third information is used for indicating that a measurement is performed on the first radio signal; the third information occupies 1 information bit.

In one embodiment, the third transmitter 1201 comprises the antenna 420, the transmitter 418, the multi-antenna transmitting processor 471, the transmitting processor 416, the controller/processor 475, and the memory 476 in FIG. 4 of the present disclosure.

In one embodiment, the third transmitter 1201 comprises the antenna 420, the transmitter 418, the multi-antenna transmitting processor 471 and the transmitting processor 416 in FIG. 4 of the present disclosure.

In one embodiment, the third transmitter 1201 comprises the antenna 420, the transmitter 418 and the transmitting processor 416 in FIG. 4 of the present disclosure.

In one embodiment, the third receiver 1202 comprises the antenna 420, the receiver 418, the multi-antenna receiving processor 472, the receiving processor 470, the controller/processor 475, the memory 476 and the data source 467 in FIG. 4 of the present disclosure.

In one embodiment, the third receiver 1202 comprises the antenna 420, the receiver 418, the multi-antenna receiving processor 472 and the receiving processor 470 in FIG. 4 of the present disclosure.

In one embodiment, the third receiver 1202 comprises the antenna 420, the receiver 418 and the receiving processor 470 in FIG. 4 of the present disclosure.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macrocellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A User Equipment (UE) for wireless communications, comprising:

a processor;

a receiver; and a transmitter;

the receiver configured to perform a measurement on a first radio signal, wherein the first radio signal is associated with a neighboring cell of a neighbor node;

the processor configured to determine a measurement value based on the measurement performed on the first radio signal;

the receiver further configured to receive a signaling from the neighbor node, the signaling comprising measurement report configuration information;

the processor further configured to determine a reference value based on the signaling;

the processor further configured to determine whether the measurement value is greater than the reference value;

the processor further configured to determine, based on a distance threshold, whether a relative positional relationship between a geographical location of the UE and a reference geographical area is fulfilled;

a transmitter configured to, on a condition that: the measurement value is greater than the reference value, and the relative positional relationship between the geographical location of the UE and the reference geographical area is fulfilled, transmit a second radio signal.

2. The UE according to claim 1, wherein the UE is associated with a serving cell of a Non-Terrestrial Network (NTN) base station.

3. The UE according to claim 1, wherein the second radio signal is a Layer 1 signal.

4. The UE according to claim 1, wherein the receiver is further configured to receive first information, wherein the condition is one of a plurality of conditions, and wherein the first information is used to determine the first candidate condition from the plurality of conditions.

5. The UE according to claim 1, wherein the receiver is further configured to receive second information, wherein the second information is used to determine the reference geographical area, wherein the reference geographical area is associated with an identifier.

6. The UE according to claim 1, wherein the receiver is further configured to receive third information, wherein the third information comprises 1 information bit, and wherein the third information is used for indicating whether the measurement is to be performed on the first radio signal, wherein, when the first geographical location of the UE is in an inner part of the reference geographical area, the third information is used for indicatingindicates that the measurement is not to be performed on the first radio signal, and wherein, when the geographical location of the UE is at an edge/peripheral position of the reference geographical area, the third information indicates that the measurement is to be performed on the first radio signal.

7. The UE according to claim 1, wherein the UE is capable of positioning.

8. The UE according to claim 1, wherein; the geographical location is related to a longitude, a latitude and an altitude; or, the geographical location is related to the longitude and the latitude.

9. A method for wireless communications performed by a User Equipment (UE), the method comprising:

performing a measurement on a first radio signal, wherein the first radio signal is associated with a neighboring cell of a neighbor node;

determining a measurement value based on the measurement performed on the first radio signal;

receiving a signaling from the neighbor node, the first signaling comprising a measurement report configuration information;

determining a reference value based on the signaling;

determining whether the measurement value is greater than the reference value;

determining, based on a distance threshold, whether a relative positional relationship between a geographical location of the UE and a reference geographical area is fulfilled;

on a condition that the measurement value is greater than the reference value, and the relative positional relation between the geographical location of the UE and the reference geographical area is fulfilled, transmitting a second radio signal.

10. The method according to claim 9, wherein the UE is associated with a serving cell of a Non-Terrestrial Network (NTN) base station.

11. The method according to claim 9, wherein the second radio signal is a Layer 1 signal.

12. The method according to claim 9, comprising:

receiving first information, wherein the condition is one of a plurality of conditions, and wherein the first information is used to determine the condition from the plurality of conditions.

13. The method according to claim 9, comprising:

receiving second information, wherein the second information is used to determine the reference geographical area, wherein the reference geographical area is associated with an identifier.

14. The method according to claim 9, wherein the UE is capable of positioning.

15. The method according to claim 9, wherein: the geographical location is related to a longitude, a latitude and an altitude; or, the geographical location is related to the longitude and the latitude.

* * * * *